United States Patent
Jensen

(10) Patent No.: US 6,652,898 B2
(45) Date of Patent: Nov. 25, 2003

(54) PROCESS FOR PRODUCING A MILK OR WHEY PRODUCT HAVING A REDUCED SPORES AND BACTERIA CONTENT

(75) Inventor: John Jensen, Hinnerup (DK)

(73) Assignee: Niro Holding A/S, Soborg (DK)

( * ) Notice: Subject to any disclaimer, the term of this patent is extended or adjusted under 35 U.S.C. 154(b) by 126 days.

(21) Appl. No.: 09/791,871

(22) Filed: Feb. 26, 2001

(65) Prior Publication Data

US 2002/0155203 A1 Oct. 24, 2002

(30) Foreign Application Priority Data

Feb. 15, 2001 (DK) .................. PCT/DK01/00107

(51) Int. Cl.[7] .................................. A23C 3/00
(52) U.S. Cl. ................. 426/422; 426/522; 426/583
(58) Field of Search ...................... 426/422, 522, 426/583

(56) References Cited

U.S. PATENT DOCUMENTS

| 4,876,100 A | 10/1989 | Holm, et al. |
| 5,685,990 A | 11/1997 | Saugmann et al. |
| 5,935,632 A | 8/1999 | Larsen |
| 6,270,823 B1 * | 8/2001 | Jolkin |

FOREIGN PATENT DOCUMENTS

| EP | 0 687 816 B1 | 12/1995 |
| WO | 91/09667 | 7/1991 |
| WO | WO0074495 | * 12/2000 |

* cited by examiner

Primary Examiner—Anthony J. Weier
(74) Attorney, Agent, or Firm—Sughrue Mion, PLLC

(57) ABSTRACT

The invention deals with a process for the manufacture of a milk or whey product having a reduced spores and bacteria content, especially for the treatment of milk for the manufacture of standardized consumer milk or cheese milk and skim milk powder or whole milk powder. The invention enables the manufacture of the desired milk product using skim milk having a reduced content of microorganisms (spores and bacteria) relative to the prior art processes. Furthermore, the invention can be applied in connection with the manufacture of whey or pre-concentrated whey having a reduced spores and bacteria content.

3 Claims, 3 Drawing Sheets

PROCESS FOR PRODUCING A MILK OR WHEY PRODUCT HAVING A REDUCED SPORES AND BACTERIA CONTENT

FIELD OF THE INVENTION

The invention relates to a process for the manufacture of a milk product having a reduced spores and bacteria content, especially a process for treating milk to produce standardized milk for consumption or cheese making, or skim milk powder or whole milk powder as well as a plant for carrying out the process, and also a process for the manufacture of whey or pre-concentrated whey having a reduced spores and bacteria content, and to a plant for performing the process In the production of standardized milk for consumption or cheese making or milk powder the starting material, viz. the milk, is conventionally separated into a cream fraction and a skim milk fraction before the subsequent processing. The cream fraction which has a high content of spores and bacteria (microorganisms) is subjected to a heat treatment suitable to obtain a maximum killing of these microorganisms (sterilization). In parallel to the treatment of the cream fraction, the skim milk fraction which also contains spores and bacteria (microorganisms) and fat is subjected to a microfiltration resulting in a separation into a retentate carrying an increased content of microorganisms and fat and a permeate consisting of skim milk having reduced microorganism and fat content. The sterilized cream fraction and the permeate consisting of skim milk of reduced microorganism and fat content is brought together and mixed in a defined ratio to produce the desired milk products.

It is an advantage of the prior art processing method that only a minor portion of the milk product, viz. the cream fraction, has to be sterilized to obtain a standardized milk for human consumption or cheese making having a reduced content of microorganisms. Thus, the permeate consisting of skim milk having a reduced content of microorganisms and fat needs not to be heated when the content of such micro biological contaminations are sufficiently low. By omitting this heating, a more or less pronounced conversion of the proteins in the permeate due to denaturation is avoided and also the complete or partial destruction of enzymes in the permeate is prevented.

It is well-known that such changes of the milk inter alia influence the curdling ability of the milk when used in cheese making. This may for instance result in liberation of moisture during the subsequent curing of the cheese, or if the milk has been subjected to intensive heating it may become completely unsuitable for the manufacture of cheese.

The possibility of omitting a heat treatment or at least to use only a lenient heat treatment of the permeate due to the low content therein of the microorganisms influencing the shelf-life of the milk product (bacteria, yeasts, moulds, virus, and bacteriophages) is advantageous in connection with the production of standardized milk for human consumption. Hereby the desired organoleptic and nutritional characteristics of the milk are maintained at least in this component of the mixture.

Besides, the reduction of the microfiltration to the skim milk fraction alone involves a considerably increased capacity of the microfilter.

STATE OF THE ART

It is an object of the invention to provide a process according to the preamble of claim 1. A process of this type is known from EP 0 194 286 B1 or U.S. Pat. No. 4,876,100. However, this process is restricted as far as the recovering of the cream fraction and the skim milk fraction is concerned to the use of a preliminary centrifugal separation of the milk in spatial vicinity to the subsequent treatment. By said process the microfiltration of the skim milk is especially important. The skim milk is during the microfiltration recycled in a loop including a microfilter arranged so that the skim milk flows parallel to the surface of the filter membrane (crossflow filtration). The microfilter is provided with pipes and connected in a conventional manner, i.e. the microfiltration unit consisting of the microfilter and the pipe connections belonging thereto is supplied with the skim milk to be filtered through a feed conduit, and the permeate passing through the microfiltration membrane as well as the concentrate (the retentate) which builds up in the flow loop is recovered from the microfiltration unit through conduits connected thereto. Subsequently, the retentate is sterilized. In one embodiment of the plant, a recycling loop is connected to the permeate exit from the microfilter and a pump is used for recycling permeate from the microfilter to the inlet of the circulation loop. It is not described in which ratio any permeate is recycled to the circulation loop of the one-step microfiltration unit, and for which purpose such a recycling is performed and which result is obtained thereby.

A further process of the type in question is known from EP 0 697 816 B1. Also in this process, the cream fraction and the skim milk fraction are recovered by a centrifugal separation of the milk in spatial vicinity to the subsequent treatment. By this process, the concentrate containing spores and bacteria (microorganisms) which leaves the microfiltration unit as retentate is recycled to the centrifugation and mixed with the milk fed to the centrifugal separator.

The process of EP 0 697 816 B1 can only be used when the cream and skim milk fractions are recovered from a milk centrifugal separator connected prior to the plant for their further treatment and spatially near said plant. Thus, it cannot be used when for instance the two fractions are provided from feed vessels connected upstream of the equipment for further treatment spatially near thereto.

WO 91/09667 discloses a process for performing tangential microfiltration, reverse osmosis or ultra-filtration using a two-stage plant. No information is given on the envisaged field of application. In this process, a retentate formed in a first step is used as feed for a second step. It is not specified how the permeates from the two steps are used or handled. A process of this type, and in which the two permeates are pooled, is depicted in FIG. 3 on the drawing attached hereto.

The amount of germs in the final products of prior art processes using microfiltration within the dairy industry is unsatisfactory due to the skim milk component available for mixing with the cream fraction. For the above-mentioned reasons (complete omission of a heat treatment or only a lenient heat treatment) it is desired and attempted to reduce the content of microorganisms in the available skim milk as far as possible since these microorganisms have a decisive influence on the shelf-life of the milk product.

From WO 00/74495 and U.S. Pat. No. 5,685,990 it is known to perform filtration, incl. microfiltration, using two or more steps. The permeate from one step is conducted to one or more steps, meaning that it passes through at least two membranes. Thereby an efficient and safe purification is obtained but at the cost of capacity/required filter area. Another drawback is the repeated recircling of the fraction having the highest bacteria content.

The drawbacks of the above briefly described known processes for producing standardized consumer or cheese milk also exists when skim milk powder or whole milk powder is the final milk product. An object of the present invention is to provide a process of the type dealt with by which it is possible to produce the desired milk product via a skim milk having a reduced content of microorganisms (germs and bacteria) compared to the microoganism content in prior art processes. Moreover, the invention makes it possible to produce whey or pre-concentrated whey having a reduced spores and bacteria content by using characteristic features thereof.

SUMMARY OF THE INVENTION

The object of the invention is achieved by a process having the characteristics defined in claim 1. Preferred embodiments of the proposed process are subject of the sub-claims. Independent claim 1 characterizes a process for producing a whey product or having a reduced spores and bacteria content.

According to the invention, the process is carried out using a two-steps microfiltration. A first permeate formed in the first step of the microfiltration, which permeate consists of the skim milk having a reduced content of microorganisms and fat, is mixed with the sterilized cream fraction. The second step of the microfiltration is fed with a retentate from the first step, and a second permeate formed in the second step is completely or partially recycled to the skim milk fraction at the inlet into the first step.

By the process according to the invention, it is possible to reduce the content of microorganisms and fat in the resulting permeate significantly compared to the corresponding content of microorganisms and fat in the permeate from prior art processes. Relevant comparison data can be found in the below example calculations (Tables 1 and 2).

A further advantage of the process of the invention is that the reduced content of microorganisms in the permeate which has an essential influence on the shelf-life of the milk product, can be obtained without extra investments in the equipment. By an embodiment of the proposed process, the content of microorganisms in the permeate can be influenced within some limits when a part of the second permeate is added directly to the first permeate.

The proposed process is generally applicable under operational conditions in which the cream and skim milk fractions are recovered from a centrifugal separation of the milk performed spatially near the further treatment. In this case, these two fractions can be supplied to the further treatment directly from the upstream centrifugal separation, or the two fractions may also be stored following the centrifugal separation and only conducted to further treatment at a later time and/or at another location.

A further advantage of the proposed process is that it can also be used in such operational circumstances where the two fractions are provided from a stock spatially near and upstream of their further treatment, i.e. without direct or indirect spatial relation to the centrifugal separation of the milk.

The essential feature of the proposed plant for performing the process of the invention is a two-steps microfiltration unit. The two steps are performed in a manner known per se as known from the relevant prior art, as far as the construction of the microfiltration device is concerned, and is sufficiently described in the prior art (cf. e.g. Société de Ceramique Techniques (SCT), MEMBRALOX® USERS' MANUAL). In a first embodiment, the two-steps microfiltration unit is connected directly to a centrifugal separator. Furthermore, a stock vessel for the relevant fractions can be inserted in the feed conduit for the cream fraction and in the feed conduit for the skim milk fraction from the centrifugal separator. Moreover, the two fractions can, according to a further embodiment, each be taken from a stock vessel independent on the presence of a centrifugal separation unit.

The first microfiltration section and the second microfiltration section each have at least one microfiltration module. Each microfiltration module has at least one microfiltration element sealed in a housing having connections for the liquid to be filtered as well as for the permeate and the retentate. The microfiltration element is preferably made of a porous carrier material permeable for the permeate and it has at least one duct through which the liquid to be filtered is flowing, the wall of which duct forms the carrier surface for the microfiltration membrane.

The operational period for such microfiltration elements and the so-called flux through the microfiltration membrane of such elements is favourably influenced or increased when one or more of the features of the microfiltration element construction, such as the gradients of the thickness of the active membrane layer, the porosity of the membrane layer and/or support, when seen over the length subjected to the liquid flow compensates for the change of the pressure difference between the side for the liquid to be filtered and the permeate side, as is the case in a preferred embodiment of the invention.

The microfiltration sections of the plant according to the invention are equipped with the same or different microfiltration membranes having a pore size of 0.05–5.0 $\mu$m. For the manufacture of standardized milk for human consumption or for cheese making it is preferred to use a pore size of 0.8–1.4 $\mu$m. For other applications smaller pore sizes, down to 0.05 $\mu$m can be used.

The operational period and the so-called flux for the microfiltration membrane are favourably influenced and becomes optimal when the crossflow velocity tangentially over the microfiltration membrane in the circulation loop of the first and/or the second microfiltration unit is in the range of $4<v<10$ m/s, preferably $v\approx 6$ m/s.

Basically, all available membrane materials suitable for the desired milk or whey product can be used. Especially satisfactory results are obtained in embodiments using ceramic membrane materials having high chemical resistance. This is especially important during the cleaning procedures (CIP-cleaning) necessarily carried out at fixed intervals.

The inventive features of the proposed process comprise a further important application, viz. the decrease of the spores and bacteria content in whey or pre-concentrated whey without subjecting these wheys to a thermal treatment. This is important since the constituents of the whey, such as whey proteins and lactose, are of nutritional value and should be converted as little as possible. Besides, structural developments in the cheese industries have resulted in the production of larger amounts of whey than can be used directly as animal feed. Due to the content of organic components, such as proteins and lactose, the disposal as waste water is not allowed.

By this application of the present process, the spores and bacteria containing whey is subjected to a microfiltration similar to the above described treatment of the skim milk fraction obtained from the milk. The whey is separated in a manner known per se in a retentate having an increased content of spores and bacteria and in a permeate having a reduced content of such microorganisms. The microfiltration of the microorganisms containing whey is performed in two steps, whereby the first step generates a first permeate consisting of whey having a reduced content of microorganisms. The subsequent second step is supplied with a retentate from the first step, and a second permeate formed in the second step is recycled completely or partially to the inlet of the first step.

According to an embodiment of the proposed process, the content of microorganisms in the permeate can also in this application be changed within some limits if a portion of the second permeate is recycled directly to the first permeate.

The plant for performing the process to produce whey having a reduced content of spores and bacteria corresponds as far as the here relevant microfiltration unit is concerned, to the plant used for treatment of the skim milk fraction obtained from the milk. Also the variations of the plant described for this purpose are relevant for the plant used for whey treatment.

It can be concluded that the embodiments of the invention in the various applications thereof (milk or whey products) besides the above described advantages, such as reduction of the spores and bacteria content in milk or whey products, always involves reduction of operating costs and energy consumption relative to the prior art processes and plants.

BRIEF DESCRIPTION OF THE DRAWING

In the following, the invention is further elucidated by means of an Example and with reference to the drawings wherein.

LIST OF THE REFERENCE NUMBERS AND ABBREVIATIONS

FIG. 1

Figure 1:
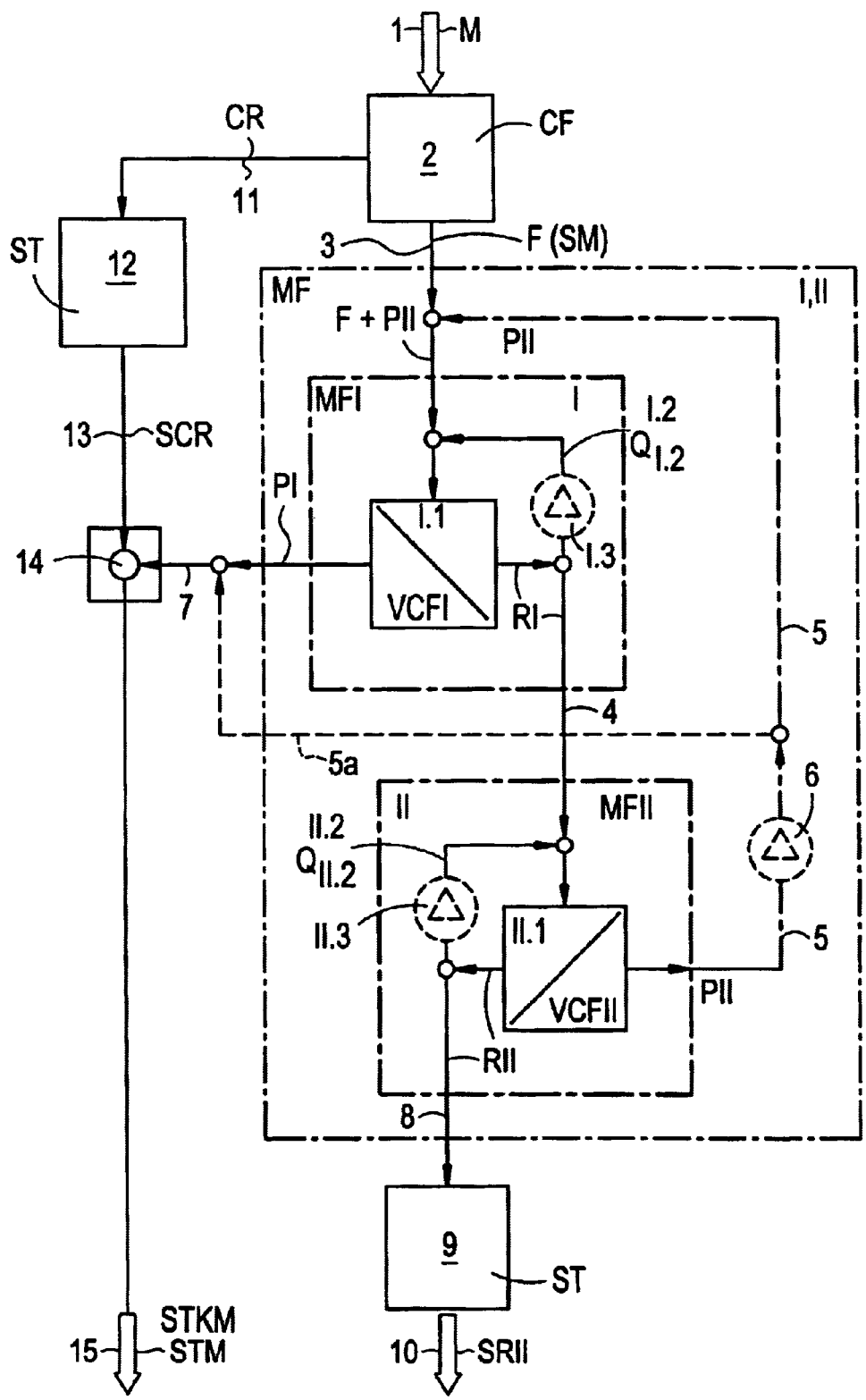
FIG. 1 is a flow sheet illustrating the principles in one embodiment of the process and the plant according to the invention.

Plant 1 conduit
2 centrifugal separator
3 first feed conduit
4 first connection conduit
5 first recycling conduit
5a second recycling conduit
6 recycling pump
7 permeate conduit
8 retentate conduit
9 second sterilization unit
10 first exit conduit
11 second feed conduit
12 first sterilization unit
13 second connection conduit
14 mixing zone
15 second exit conduit
I first microfiltration section (step I)
I.1 first microfilter module
I.2 first circulation loop
I.3 first circulation pump VCFI volume concentration factor (step I)
II second microfiltration section (step II)
II.1 second microfilter module
II.2 second circulation loop
II.3 second circulation pump
VCFII volume concentration factor (step II)

Process Steps

Figure 2:
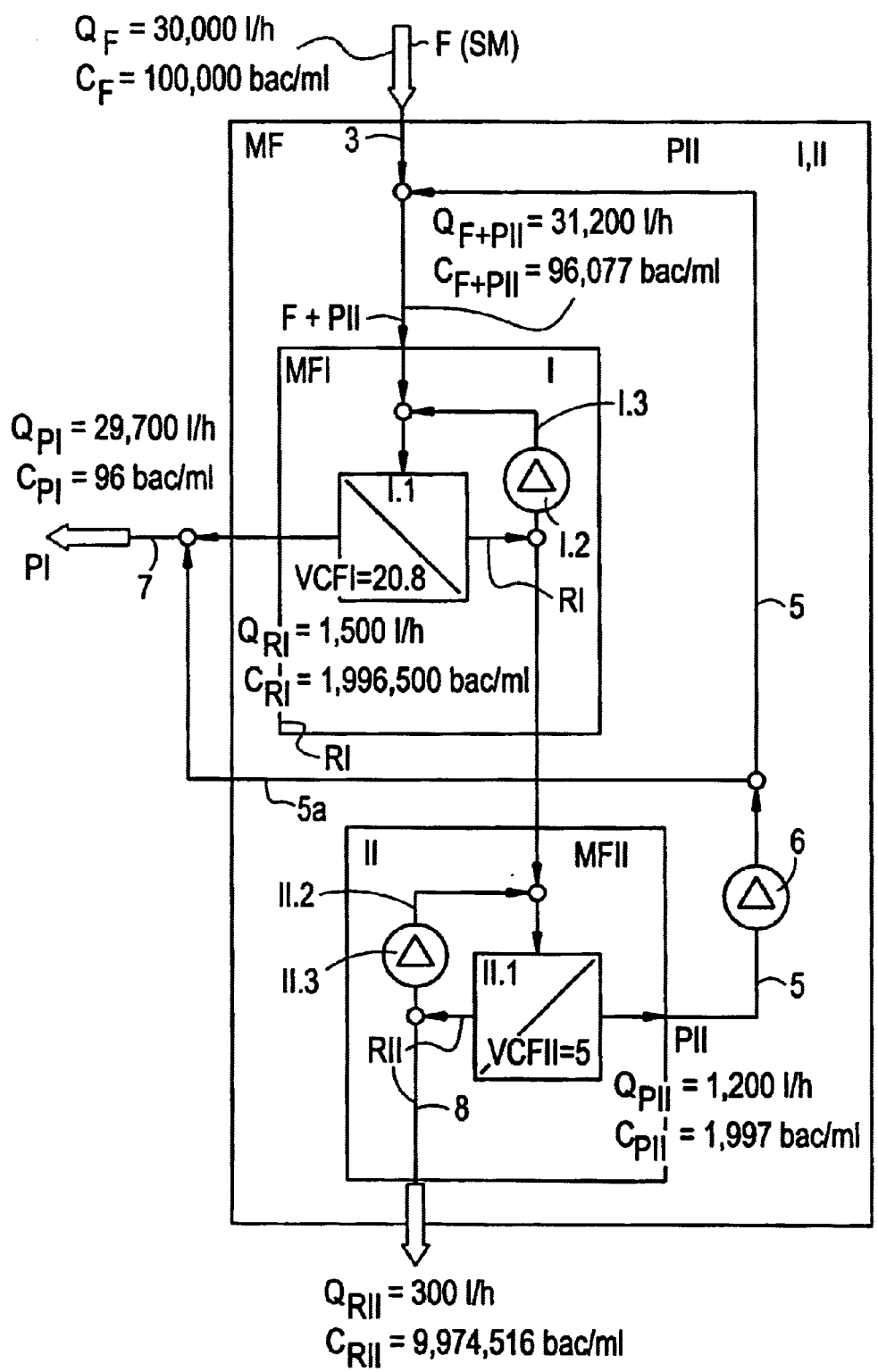
FIG. 2 is a flow sheet of the two-steps microfiltration according to FIG. 1 showing a volume flow and concentration balance theoretically obtainable by the process of the invention using data for the microfiltration choosen by way of example.
Figure 3:
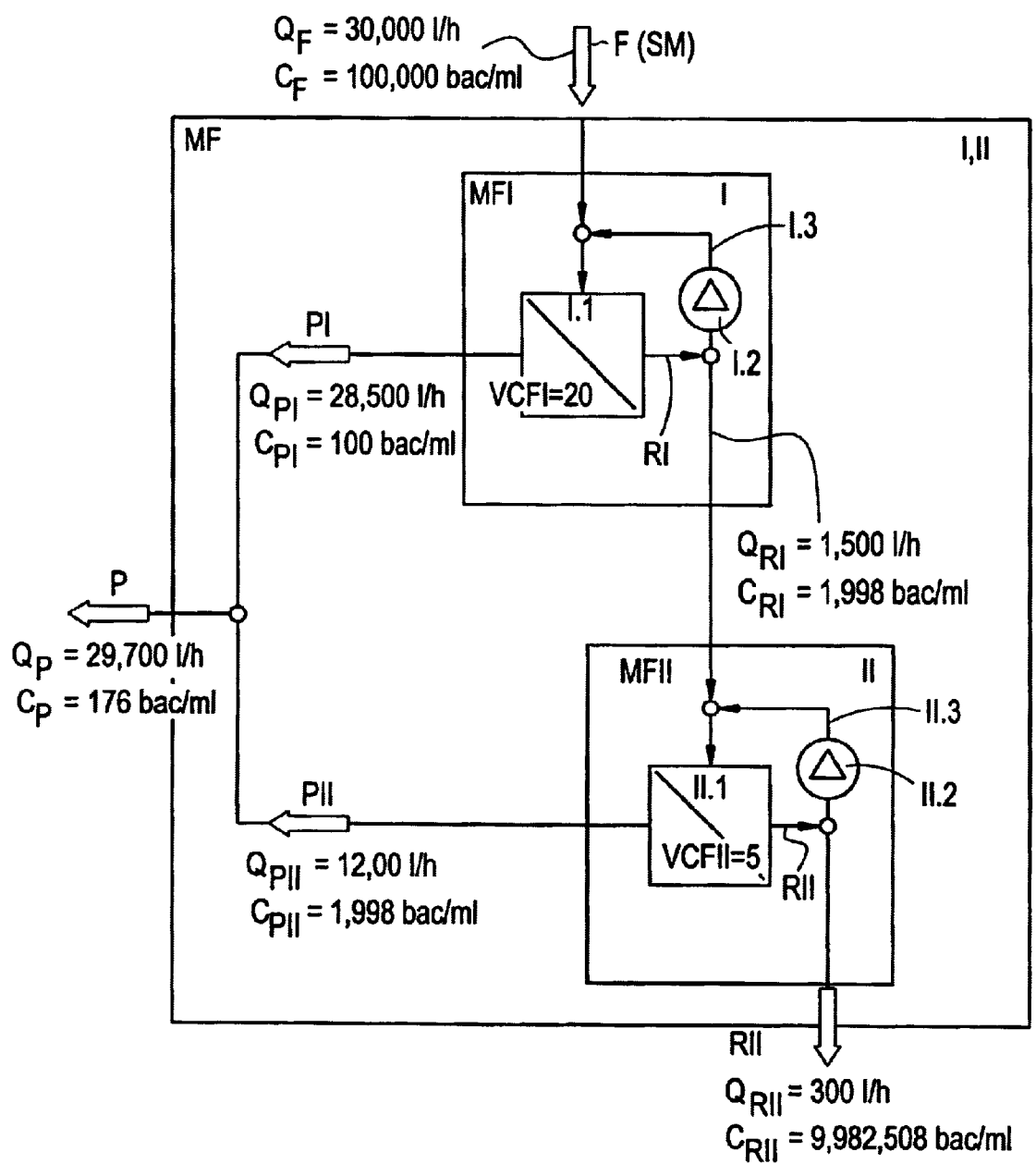
FIG. 3 is also a flow sheet which for the purpose of comparison shows the theoretically obtainable volume flow and concentration balance in a prior art two-steps microfiltration.

MF microfiltration
MFI first microfiltration (step I)
MFII second microfiltration (step II)
CF centrifugal separation
ST sterilization Substance Flows M milk
CR cream fraction
SCR sterilized cream
SM skim milk fraction
F feed to microfiltration (liquid to be filtered)
PI first permeate
RI first retentate
PII second permeate
RII second retentate
SRII sterilized second retentate
$Q_{I.2}$ volume flow in first circulation loop
$Q_{II.2}$ volume flow in second circulation loop
STM standardized milk for human consumption
STKM standardized milk for cheese making
FIGS. 2 and 3

Volume Flow and Concentration Balance $Q_F$ volume flow in feed to microfiltration MF in l/h
$Q_{PII}$ volume flow of second permeate in l/h
$Q_{F+PII}$ volume flow of feed and second permeate in l/h
$Q_{PI}$ volume flow of first permeate in l/h
$Q_{RI}$ volume flow of first retentate in l/h
$Q_{RII}$ volume flow of second retentate in l/h
$C_F$ concentration of microorganisms in feed in bac/ml
$C_{PII}$ concentration of microorganisms in second permeate in bac/ml
$C_{F+PII}$ concentration of microorganisms in feed plus second permeate in bac/ml
$C_{PI}$ concentration of microorganisms in first permeate in bac/ml
$C_{RI}$ concentration of microorganisms in first retentate in bac/ml
$C_{RII}$ concentration of microorganisms in second retentate in bac/ml

FIG. 3

P total permeate from the microfiltration MF
$Q_P$ volume flow of total permeate in l/h
$C_P$ concentration of microorganisms in total permeate in bac/ml Detailed Description In FIG. 1, M designates milk to be treated which is fed to a centrifugal separator 2 via a conduit 1. In centrifugal separator 2, the milk M is by the centrifugal separation process step CF separated in a cream fraction CR and a skim milk fraction SM. The latter flows as feed F via a first feed conduit 3 to a microfiltration unit I, II comprising two steps I and II. In the first step thereof, the first microfiltration section I, a separation takes place of the skim milk fraction SM containing microorganisms (spores and bacteria) and fat into a first retentate RI having an increased content of microorganisms and fat, and into a first permeate PI consisting of skim milk having a reduced content of microorganisms and fat. The first microfiltration section I has (in the depicted embodiment only one) first microfilter module I.1 into which the first feed conduit 3 debouches. The first retentate RI leaves the first microfilter I.1 via a first connection conduit 4 and thereby reaches (in the depicted embodiment only one) second microfilter module II.1 in the second microfiltration section II. In the first microfiltration section I, a circulation loop I.2 comprising a first circulation pump I.3 connects the first connection circuit 4 with the first feed conduit 3. The first permeate PI formed in the first microfiltration section I is withdrawn therefrom via a permeate conduit 7 and conducted to a mixing zone 14. Through the first circulation loop I.2, the first retentate RI is circulated at a volume flow which depends on the construction of the microfiltration element, and in the present example is $Q_{I.2} \approx 4,700$ l/h which results in a crossflow velocity of $v \approx 6$ m/s which has a favourable influence on the operational periods and the flux rate of the microfiltration membrane.

A second microfiltration section II is constructed similarly to the first microfiltration section. It has (in the depicted embodiment only one) second microfilter module II.1, a second circulation loop II.2 comprising a second circulation pump II.3 and it is via a retentate conduit 8 for withdrawal of the second retentate RII connected to a second sterilization unit 9. In the latter, the second retentate II having an increased content of microorganisms and fat is subjected to a sterilization ST. Through a first exit conduit 10, a sterilized second retentate SRII is withdrawn from the plant for further use. To ensure a sufficient crossflow velocity V, recycling is performed within the second microfiltration unit II of the second retentate RII through the second circulation loop II.2 with the necessary volume flow $Q_{II.2}$. As alternative to sterilizing the second retentate SRII in a second sterilization unit 9, said retentate may be introduced upstream of a first sterilization unit 12 (mentioned below) and sterilized therein together with the cream fraction.

According to a first alternative embodiment of the process, a second permeate PII formed in the second microfiltration section II is completely recycled from there through a first recycling conduit 5, into which a recycling pump 6 may be inserted, into the skim milk fraction SM in the first feed conduit 3 at the inlet to the first microfiltration section I. The recycling pump 6 can be omitted when the pressure in the permeate II is higher than the pressure in the feed F. Such advantageous relative pressures can be obtained by proper adjustment of the plant. By this recycling of the second permeate PII a volume flow reaches the first microfiltration section I which flow consists of the volume flow of the feed F and the volume flow of the second permeate PII. The abbreviation VCFI designates the so-called volume-concentration-factor of the first microfiltration section I and it indicates the ratio of the volume flow $Q_{F+PII}$ consisting of the feed F and the second permeate PII flowing to the first microfiltration section I to the volume flow QRI of the first retentate RI (VCFI=$Q_{F+PII}/Q_{RI}$).

Similarly, the designation VCFII indicates the ratio of the volume flow QRI of the first retentate RI flowing to the second microfiltration section II to the leaving volume stream $Q_{RII}$ of the second retentate RII (VCFII=$Q_{RI}/Q_{RII}$). In addition to these ratios of the volume flows which indicate the throughput capacity of the microfiltration sections I and II, the separation performance of the microfilter modules I.1 and II.1 is determined by the selection of materials to be used as microfiltration membranes and in this respect especially the pore size of the materials is important. By using microfiltration membranes having a pore size in the range from 0.8–1.4 $\mu$m, preferably of ceramic membrane materials, it is possible to obtain a reduction of the content of microorganisms (spores and bacteria) in the relevant permeate PI or PII by a factor of 1,000 relative to the corresponding feeds (feed F+PII or RI), cf. also FIG. 2.

According to a second alternative embodiment of the process, only a portion of the second permeate PII formed in the second microfiltration section II is recycled to the skim milk fraction SM at the inlet of the first microfiltration section I. The remaining portion is led to the first permeate PI upstream of the mixing zone 14 via a second recycling conduit 5a which branches off the first recycling conduit 5 downstream of the recycling pump 6 and debouches in the permeate conduit 7. By these means, the content of microorganisms in the first permeate PI can be changed and adjusted within certain limits.

The cream fraction CR obtained from the centrifugal separator 2 is through a second feed conduit 11 led to a first sterilization unit 12 (process step sterilization ST) which by heating the cream fraction CR to a suitable sterilization temperature provides sterilized cream SCR. By means of a second connection conduit 13, this is led from the first sterilization unit 12 to the mixing zone 14 where the sterilized cream fraction SCR and the first permeate PI are brought together in a defined ratio and mixed to produce the desired milk product, viz. standardized milk for human consumption STM or standardized milk for cheese making STKM. The milk for human consumption STM or the milk for cheese making STKM is via an exit conduit 15 from the mixing zone 14 led to a further treatment, for instance a pasteurization, not shown.

If required, the microorganisms reducing effect of the process and the plant may be increased by subjecting the second permeate P II to a separating treatment (not shown), e.g. a further microfiltration or a bacterofugation, before introducing it into the first permeate PI in conduit 7 or into the feed upstream of the first microfiltration module II 1.

The plant diagrammatically shown in FIG. 1, and which forms basis for the calculations in FIG. 2, has two microfiltration steps. However, it is within the scope of the invention to use one or more further steps and recycle the permeate from each such further step, at least partially, to one or more of the steps upstream thereof relative to the retentate flow.

Volume Flow and Concentration Balance for the Plant According to the Invention in Connection with a Two-steps Microfiltration MF (FIG. 2)

The starting point for a comparison is a skim milk fraction SM which is provided as feed F to the two-steps microfiltration MF at a volume flow $Q_F$=30,000 l/h. The concentration of microorganisms (spores and bacteria) in feed F is $C_F$=100,000 bac/ml. In the first step, MFI of the microfiltration, the first permeate PI is generated at a volume flow $Q_{PI}$=29,700 l/h. The second retentate RII leaves the second step MFII of the microfiltration at a volume flow $Q_{RII}$=300 l/h and in said second step, the second permeate PII is formed at a volume flow $Q_{PII}$=1,200 l/h which is recycled to the feed F at the inlet to the first step MFI of the microfiltration. This recycling results in a volume flow $Q_{F+PII}$=31,200 l/h being fed to the first step MFI of the microfiltration. The first retentate RI therefore leaves the first step MFI of the microfiltration at a volume flow $Q_{RI}=1,500$ l/h to be subsequently fed to the second step MFII of the microfiltration. These volume flows correspond to a volume concentration factor of the microfiltration MFI of VCFI=$Q_{F+PII}/Q_{RI}=20.8$ and a volume concentration factor for the second microfiltration MFII of VCFII=$Q_{RI}/Q_{RII}=5$. These specific values are selected by way of example. It is just as feasible to have a volume concentration factor VCFII=10.

Based on the above-mentioned volume streams and the reduction of the content of microorganisms (dependent on the selected pore size) in the first permeate PI and in the second permeate PTI at a obtainable concentration ratio $C_{F+PII}/C_{PI}=C_{RII}/C_{PII}=1,000$, the concentration of microorganisms is obtained as indicated in FIG. 2 at the relevant balance sites. It is evident that the first permeate PI which by the process of the invention is conducted to the mixing zone 14 (FIG. 1) when complete recycling of the second permeate PII is performed to the inlet of the first microfiltration MFI, has a concentration of micro-organisms of only $C_{PI}=96$ bac/ml. This is a theoretical result. In practice this concentration is lower since a part of the microorganisms is killed by being subjected to stress during microfiltration and circulation. All volume flows and concentrations for the process of the invention from FIG. 2 are listed in the following Table 1.

TABLE 1

| Volume flow Q in l/h | | | Concentration in bac/ml | | |
|---|---|---|---|---|---|
| $Q_F$ | = | 30000 | $C_F$ | = | 100000 |
| $Q_{F+PII}$ | = | 31200 | $C_{F+PII}$ | = | 96077 |
| $Q_{PI}$ | = | 29700 | $C_{PI}$ | = | 96 |
| $Q_{RI}$ | = | 1500 | $C_{RI}$ | = | 1996500 |
| $Q_{PII}$ | = | 1200 | $C_{PII}$ | = | 1997 |
| $Q_{RII}$ | = | 300 | $C_{RII}$ | = | 9990010 |

Volume Flow and Concentration Balance for a Plant According to the Prior Art Using Two-steps Microfiltration MF (FIG. 3)

For the purpose of comparison with the process of the invention, the corresponding volume flow and concentration balance is produced for a two-steps microfiltration MF according to the prior art, as it appears from FIG. 3 and the following Table (Table 2). The total permeate P resulting from the first permeate PI and the second permeate PII generated by the microfiltrations MFI and MFII, resp. has the above stated volume flow $Q_P=29700$ l/h which shows a concentration of microorganisms of $C_P=176$ bac/ml. As in the process according to the invention, the feed F has a volume flow $Q_F=30000$ l/h and a concentration of microorganisms $C_F=100000$ bac/ml. The second retentate RII leaving the microfiltration MF has the volume flow $Q_{RII}=300$ l/h as in the process of the invention. The following table lists the individual volume flows and the corresponding concentrations of microorganisms:

TABLE 2

| Volume flow Q in l/h | | | Concentration in bac/ml | | |
|---|---|---|---|---|---|
| $Q_F$ | = | 30000 | $C_F$ | = | 100000 |
| $Q_{PI}$ | = | 28500 | $C_{PI}$ | = | 100 |
| $Q_{RI}$ | = | 1500 | $C_{RI}$ | = | 1998100 |
| $Q_{PII}$ | = | 1200 | $C_{PII}$ | = | 1998 |
| $Q_{RII}$ | = | 300 | $C_{RII}$ | = | 9982508 |
| $Q_P$ | = | 29700 | $C_P$ | = | 176 |

From the above it appears that when using similar conditions, the concentration $C_{PI}$ of microorganisms relevant for the manufacture of standardized consumer or cheese making milk $C_{PI}$ of the permeate PI which are mixed with the sterilized cream SCR by the process of the invention, is nearly diminished by one half relative to the concentration in the prior art process ($C_{PI}=96$ bac/ml versus $C_P=176$ bac/ml)

The starting material in the embodiment depicted in FIG. 1 is milk necessitating an initial separation into a cream fraction and a skim milk fraction. However, the concept of the invention is generally applicable and can be used for treating also starting materials which are not subjected to such an initial separation. Moreover, if initial separation is used, the process does not necessarily involve a recombination of the separated fractions after treatment thereof.

What is claimed is:

1. A process for the manufacture of a whey product having a reduced spores and bacteria content, comprising:

conducting a first microfiltration step on the whey product, wherein said first step produces a first permeate consisting of whey product having a reduced microorganism content and a retentate, supplying at least some of said retentate from said first step to a second microfiltration step, wherein said second step produces a second permeate, and recycling at least some of said second permeate formed in said second step to said whey product at an inlet to said first step.

2. A process according to claim 1, comprising recycling a total amount of said second permeate to said inlet of said first step.

3. A process according to claim 1, comprising recycling at least a portion of said second permeate directly to said first permeate.

* * * * *